(12) United States Patent
Nasu et al.

(10) Patent No.: US 9,110,888 B2
(45) Date of Patent: Aug. 18, 2015

(54) SERVICE SERVER APPARATUS, SERVICE PROVIDING METHOD, AND SERVICE PROVIDING PROGRAM FOR PROVIDING A SERVICE OTHER THAN A TELEPHONE CALL DURING THE TELEPHONE CALL ON A TELEPHONE

(75) Inventors: Kazunori Nasu, Chiyoda-ku (JP); Seiji Shibata, Chiyoda-ku (JP); Mari Akuzawa, Chiyoda-ku (JP); Ken Uchiyama, Chiyoda-ku (JP)

(73) Assignee: NTT DOCOMO, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 13/816,705

(22) PCT Filed: May 24, 2012

(86) PCT No.: PCT/JP2012/003393
§ 371 (c)(1),
(2), (4) Date: Feb. 12, 2013

(87) PCT Pub. No.: WO2012/160824
PCT Pub. Date: Nov. 29, 2012

(65) Prior Publication Data
US 2014/0180668 A1 Jun. 26, 2014

(30) Foreign Application Priority Data

May 24, 2011 (JP) .................................. 2011-116401
May 23, 2012 (JP) .................................. 2012-117545

(51) Int. Cl.
*G06F 17/28* (2006.01)
*G10L 15/30* (2013.01)
(Continued)

(52) U.S. Cl.
CPC .............. *G06F 17/28* (2013.01); *G06F 17/289* (2013.01); *G10L 15/26* (2013.01); *G10L 15/30* (2013.01);
(Continued)

(58) Field of Classification Search
USPC ........................................................ 704/2–9
See application file for complete search history.

(56) References Cited

U.S. PATENT DOCUMENTS 6,985,862 B2 * 1/2006 Strom et al. .................. 704/255
2002/0046206 A1 4/2002 Obuchi et al.
(Continued)

FOREIGN PATENT DOCUMENTS

JP 64-088875 A 4/1989
JP 2002-152387 A 5/2002
(Continued)

OTHER PUBLICATIONS

Japanese Office Action dated Sep. 3, 2013, with English translation (Four (4) pages).
(Continued)

*Primary Examiner* — Barbara Reinier
(74) *Attorney, Agent, or Firm* — Crowell & Moring LLP

(57) ABSTRACT

A service server apparatus is provided which can realize a service as if a speaker has a conversation in a face-to-face manner using existing applications. The service server apparatus includes a service activating unit receiving an instruction for performing a task during a communication, a telephone/call control unit recording a call speech of the speaker during the communication between speech communication terminal devices, a speech recognizing enabler, a text translating enabler, and a speech synthesizing enabler performing the task based on the recorded call speech when the instruction is received, and a communication control enabler providing task data obtained through an performance of the task to the speech communication terminal device. The task data is text data obtained by converting the call speech into a text, translated text data obtained by translating the text data into another language, and speech data obtained by converting the translated text data into a speech.

10 Claims, 13 Drawing Sheets

(51) Int. Cl.
  *G10L 15/26* (2006.01)
  *H04M 3/42* (2006.01)
  *G10L 15/06* (2013.01)
  *G10L 15/22* (2006.01)

(52) U.S. Cl.
  CPC ......... *H04M 3/42* (2013.01); *G10L 2015/0638* (2013.01); *G10L 2015/221* (2013.01); *H04M 3/42221* (2013.01); *H04M 2201/39* (2013.01); *H04M 2201/40* (2013.01); *H04M 2201/60* (2013.01); *H04M 2203/2061* (2013.01)

(56) References Cited

U.S. PATENT DOCUMENTS

| | | | |
|---|---|---|---|
| 2002/0181669 | A1 | 12/2002 | Takatori et al. |
| 2009/0177461 | A1 | 7/2009 | Ehsani et al. |
| 2009/0281789 | A1 | 11/2009 | Waibel et al. |
| 2010/0121629 | A1 | 5/2010 | Cohen |
| 2010/0185434 | A1* | 7/2010 | Burvall et al. ............ 704/3 |
| 2010/0324894 | A1 | 12/2010 | Potkonjak |
| 2011/0313757 | A1* | 12/2011 | Hoover et al. ............ 704/9 |
| 2013/0218556 | A1* | 8/2013 | Suwa et al. ............ 704/201 |

FOREIGN PATENT DOCUMENTS

| | | |
|---|---|---|
| JP | 3339579 B2 | 10/2002 |
| JP | 2004-48277 A5 | 8/2005 |
| JP | 2005-295015 A | 10/2005 |
| JP | 3741025 B2 | 2/2006 |
| JP | 2006-109110 A | 4/2006 |
| JP | 2006-146732 A | 6/2006 |
| JP | 3142002 U | 5/2008 |
| JP | 4089148 B2 | 5/2008 |
| JP | 2010-050693 A | 3/2010 |
| JP | 2011-066917 A | 3/2011 |
| WO | WO 2008/066836 A1 | 6/2008 |

OTHER PUBLICATIONS

European Search Report dated Dec. 6, 2013 (Eight (8) sheets).
Kanbara Kenichi, "iTranslator for Android, highly functionable translation application corresponding to 20 languages", http://andronavi.com/2010/09/40880, Sep. 1, 2010, 8 pages.
"world-phone", iplatform.org, 31 pages.
Japanese Office Action (w/English translation), dated Jul. 24, 2012, 4 pages total.
Chinese Office Action dated Jul. 18, 2014, with English translation (Twenty Two (22) pages).
U.S. Appl. No. 13/816,457, filed Feb. 11, 2013, Kazunori Nasu et al.
PCT/JP2012/003393 PCT/IB/310, dated May 3, 2013, 1 page.
PCT/JP2012/003393 PCT/ISA/237 (English translation), dated Aug. 7, 2012, 4 pages.
Chinese Office Action dated Sep. 29, 2014, with English translation (Sixteen (16) pages).

* cited by examiner

IMAGE AND VIDEO SYNTHESIS/EDITION

FIG. 11

| MAY | PERSON A | PERSON B |
|---|---|---|
| 13th | AM : MEETING / SECOND CANDIDATE | SECOND CANDIDATE |
| 14th | AM : MEETING / THIRD CANDIDATE | THIRD CANDIDATE |
| 15th | | WHOLE-DAY OFF-DUTY |
| 16th | FIRST CANDIDATE | FIRST CANDIDATE |
| 17th | PM : BUSINESS TRIP | |

SERVICE SERVER APPARATUS, SERVICE PROVIDING METHOD, AND SERVICE PROVIDING PROGRAM FOR PROVIDING A SERVICE OTHER THAN A TELEPHONE CALL DURING THE TELEPHONE CALL ON A TELEPHONE

TECHNICAL FIELD

The present invention relates to a service server apparatus, a service providing method, and a service providing program for providing a service through a communication, and in particular, to a service server apparatus, a service providing method, and a service providing program for providing a service other than a telephone call during the telephone call on a telephone.

BACKGROUND ART

These days, translators and translation systems are in practical use for automatically translating the content of a talk made by a speaker in an arbitrary language into another language. Conventional translators, etc., include a so-called personal type or interactive type, and a so-called remote conversation type.

FIG. 13A is a diagram illustrating a personal type translator. In the case of FIG. 13A, for example, a speaker inputs verbal speeches "kono hon wa ikura desuka? (Japanese) how much is this book?" in Japanese into the translator. In this case, the translating function of the translator translates the Japanese verbal speeches into English and outputs synthesized speeches "how much is this book?". The personal translator can be used as a Japanese-English dictionary or can be used for a speaker to tell the intent of the speaker himself/ herself to another person by letting another person in seeing the speaker face to face to listen to the synthesized speeches. For example, Non-patent Document 1 discloses such a conventional translator.

FIG. 13B is a diagram illustrating a remote conversation type translator. The translator illustrated in FIG. 13B has a speech communication function as a telephone and a translating function. In the case of FIG. 13B, for example, a speaker who is Japanese inputs verbal speeches "please make a reservation for three people" in native Japanese into the translator. In this case, the translating function of this translator translates the Japanese verbal speeches into English, and outputs synthesized speeches "Please make a reservation for three people". The remote conversation type translator allows a speaker to tell the intent of the speaker himself/herself to another person who does not understand the native language of the speaker while the speaker is speaking in the native language. For example, Non-patent Document 2 discloses such a conventional translator.

Furthermore, Patent Document 1 discloses another remote conversation type translator. A telephone system disclosed in Patent Document 1 is capable of not only translating the content of a telephone call and transmitting the translated telephone call to a called party, but also transmitting the verbal speeches of a speaker in the telephone call to the called party. Hence, the technique disclosed in Patent Document 1 allows a user to feel as if the user were talking to a called side through an interpreter.

PRIOR ART DOCUMENTS

Patent Document

Patent Document 1: JP 3741025 B

Non-Patent Document

Non-patent Document 1: andro navi, [online], "iTranslator for Android, highly functionable translation application corresponding to 20 languages", [searched on May 13, 2011], Internet <URL: http://andronavi.com/2010/09/40880>

Non-patent Document 2: iplatform.org, [online], worldphone [searched on May 13, 2011], Internet <URL: http://www.iplatform.org/>

SUMMARY OF THE INVENTION

Problem to be Solved

Meanwhile, when two persons using different languages from each other attempt to have a conversation, in general, an interpreter interprets the languages of both persons. Neither Non-patent Document 1 nor Non-patent Document 2 realizes a service having a realistic feel, as if the two persons were having a conversation in a face-to-face manner and an interpreter were translating the languages of both persons.

Moreover, the technique disclosed in Patent Document 1 can also transmit the call speeches of the speaker to the called party. According to the technique disclosed in Patent Document 1, however, an exclusive application is activated to transmit data that is a translation of the content of the telephone call together with the verbal speeches of the speaker. The technique disclosed in Patent Document 1 needs the development of a new application to carry out its invention. This poses a problem that human and financial costs for such a development are necessary.

The present invention has been made in view of the aforementioned circumstances, and it is an object of the present invention to provide a service server apparatus, a service providing method, and a service providing program which can realize a service having a realistic feel as if the speakers were having a conversation in a face-to-face manner even if they are in remote locations, and which eliminates the development of a new exclusive application.

Solution to the Problem

To address the above drawback, according to an aspect of the present invention, there is provided a service server apparatus (e.g., a service server apparatus 200 illustrated in FIG. 2), connected to a plurality of speech communication terminal devices (e.g., a call-originating communication terminal device 241*a* and a call-receiving communication terminal device 241*b* illustrated in FIG. 2) configured to perform speech communication with each other via a speech and providing a service by a different task that is a work performed by a different application from a task performed by an application relating to the speech communication between the speech communication terminal devices, the service server apparatus including: an instruction receiving unit (e.g., a service activating unit 250 illustrated in FIG. 2) for receiving an instruction configured to perform the different task during the speech communication; a recording unit (e.g., a telephone/call control enabler 201 illustrated in FIG. 2) configured to record a call speech of a speaker during the speech communication between the plurality of speech communication terminal devices; a task performing unit (e.g., a speech recognizing enabler 203, a text translating enabler 204, and a speech synthesizing enabler 202 illustrated in FIG. 2) configured to perform the different task based on the call speech recorded by the recording unit, when the instruction receiving unit receives the instruction; and a task data providing unit (e.g., a communication control unit 224 illustrated in FIG. 2) configured to provide, to each of the plurality of speech communication terminal devices performing the speech communication, task data including text data obtained by performing the different task by the task performing unit and speech data obtained by performing the different task by the task performing unit. The task performing unit converts the call speech into a text to generate text data, translates the text data into another language to generate translated text data, and converts the translated text data into a speech to generate speech data, and the task data providing unit provides, to each of the plurality of speech communication terminal devices performing the speech communication, the task data including the text data, the translated text data, and the speech data together with the call speech.

According to an aspect of the present invention, there is provided a service server apparatus (e.g., a service server apparatus 900 illustrated in FIG. 10) connected to a plurality of speech communication terminal devices (e.g., a call-originating communication terminal device 241a and a call-receiving communication terminal device 241b illustrated in FIG. 10) configured to perform speech communication with each other via a speech and providing a service by a different task that is a work performed by a different application from an application relating to the speech communication between the speech communication terminal devices, the service server apparatus including: an instruction receiving unit (e.g., a service activating unit 250 illustrated in FIG. 10) for receiving an instruction configured to perform the different task during the speech communication; a recording unit (e.g., a telephone/call control enabler 201 illustrated in FIG. 10) configured to record a call speech of a speaker during the speech communication between the plurality of speech communication terminal devices; a task performing unit (e.g., a speech recognizing enabler 203, an information managing enabler 214, and an image/video synthesizing-editing enabler 215 illustrated in FIG. 10) configured to perform the different task based on the call speech recorded by the recording unit when the instruction receiving unit receives the instruction; and a task data providing unit (e.g., a communication control unit 224 illustrated in FIG. 10) configured to provide, to each of the plurality of speech communication terminal devices performing the speech communication, task data representing an performance result of the task by the task performing unit. The task data performing unit determines an instruction given by a user of the speech communication terminal device based on the call speech, extracts information registered beforehand in accordance with the instruction, and generates the task data including at least either one of a text and an image using the extracted information, and the task data providing unit provides, to each of the plurality of speech communication terminal devices performing the speech communication, the task data including at least either one of the text and the image together with the call speech.

The service server apparatus according to an aspect of the present invention may further include, in the above-explained configuration: a correction instruction receiving unit configured to receive a correction instruction for the task data transmitted to the speech communication terminal device; and a learning unit configured to give a weight to data used when the task data is generated based on the correction instruction received by the correction instruction receiving unit.

In the service server apparatus according to an aspect of the present invention, in the above-explained configuration, when an instruction given by the user is determined to adjust a schedule of the user, the task performing unit may extract schedule information on an activity of the user registered beforehand and a date and an hour at which the activity is to be carried out, and extract, using the extracted schedule information, a common date and hour at which no activity of the users of the plurality of speech communication terminal devices is commonly registered.

In the service server apparatus of an aspect of the present invention, according to the above-explained invention, the task data providing unit can transmit the text data in the task data to a text communication terminal device associated with the speech communication terminal device and communicable via a text instead of the speech communication terminal device.

According to an aspect of the present invention, there is provided a service providing method performed by a service server apparatus connected to a plurality of speech communication terminal devices for performing speech communication with each other via a speech, and providing a service by a different task that is a work performed by a different application from an application relating to the speech communication between the speech communication terminal devices, the service providing method including: an instruction receiving step for receiving an instruction for performing the different task during the speech communication; a recording step for recording a call speech of a speaker during the speech communication between the plurality of speech communication terminal devices; a task performing step for converting the call speech into a text to generate text data based on the call speech recorded in the recording step, translating the text data into another language to generate translated text data, and converting the translated text data into a speech to generate speech data when the instruction is received through the instruction receiving step; and a task data providing step for providing, to each of the plurality of speech communication terminal devices performing the speech communication, task data including the text data, the translated text data, and the speech data together with the call speech.

According to an aspect of the present invention, there is provided a service providing method performed by a service server apparatus connected to a plurality of speech communication terminal devices for performing speech communication with each other via a speech, and providing a service by a different task that is a work performed by a different application from an application relating to the speech communication between the speech communication terminal devices, the service providing method including: an instruction receiving step for receiving an instruction for performing the different task during the speech communication; a recording step for recording a call speech of a speaker during the speech communication between the plurality of speech communication terminal devices; a task performing step for determining an instruction given by a user of the speech communication terminal device based on the call speech recorded through the recording step, extracting information registered beforehand based on the instruction, and generating task data including at least either one of a text and an image using the extracted information when the instruction is received through the instruction receiving step; and a task data providing step for providing, to each of the plurality of speech communication terminal devices performing the speech communication, the task data including at least either one of the text and the image together with the call speech.

According to an aspect of the present invention, there is provided a service providing program performed by a service server apparatus connected to a plurality of speech communication terminal devices for performing speech communication with each other via a speech, and providing a service by a different task that is a work performed by a different application from an application relating to the speech communication between the speech communication terminal devices, the service providing program allowing a computer to realize: an instruction receiving function of receiving an instruction for performing the different task during the speech communication; a recording function of recording a call speech of a speaker during the speech communication between the plurality of speech communication terminal devices; a task performing function of converting the call speech into a text to generate text data based on the call speech recorded by the recording function, translating the text data into another language to generate translated text data, and converting the translated text data into a speech to generate speech data when the instruction is received by the instruction receiving function; and a task data providing function of providing, to each of the plurality of speech communication terminal devices performing the speech communication, task data including the text data, the translated text data, and the speech data together with the call speech.

According to an aspect of the present invention, there is provided a service providing program according to an aspect of the present invention performed by a service server apparatus connected to a plurality of speech communication terminal devices for performing speech communication with each other via a speech and providing a service by a different task that is a work performed by a different application from an application relating to the speech communication between the speech communication terminal devices, the service providing program allowing a computer to realize: an instruction receiving function of receiving an instruction for performing the different task during the speech communication; a recording function of recording a call speech of a speaker during the speech communication between the plurality of speech communication terminal devices; a task performing function of determining an instruction given by a user of the speech communication terminal device based on the call speech recorded by the recording function, extracting information registered beforehand based on the instruction, and generating task data including at least either one of a text and an image using the extracted information when the instruction is received by the instruction receiving function; and a task data providing function of providing, to each of the plurality of speech communication terminal devices performing the speech communication, the task data including at least either one of the text and the image together with the call speech.

Advantageous Effects of the Invention

According to the above-explained aspects of the present invention, task is performed by a different application from an application relating to a speech communication, and thus the call speech of the speaker can be transmitted to the communication side together with the performance result of the task through the existing application relating to speeches and the application that performs the task. With such aspects of the present invention, it is possible to provide a telephone call service having a realistic feel as if speakers were having a conversation in a face-to-face manner through an existing application, even if they are remotely located.

BRIEF DESCRIPTION OF THE DRAWINGS

FIG. 11 is a diagram exemplifying task data according to the second embodiment;

DESCRIPTION OF EMBODIMENTS

Figure 1:
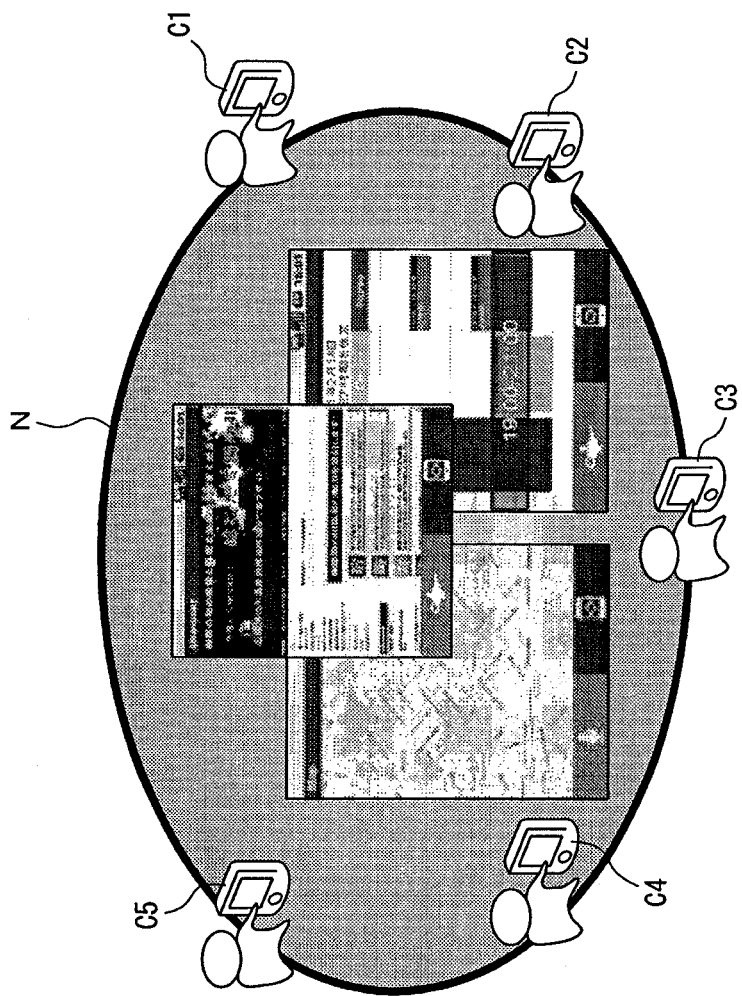
FIG. 1 is a diagram for explaining the outline of a service as a precondition to a first embodiment of the present invention.

First and second embodiments of a service server apparatus, a service providing method, and a service providing program according to the present invention will now be explained with reference to the accompanying drawings. The same structures in each drawing to be referred to below as those of other drawings will be denoted by the same reference numerals, and some of the explanation thereof will be omitted in some cases.

First Embodiment

Communication Concierge

FIG. 1 is a diagram for explaining the summary of a service as a precondition to the present embodiment. This service is developed so as to support a conversation (hereinafter, referred to as a telephone call) through a communication terminal device having a telephone call function as if a user were seeing a called person and having a face to face conversation. The service as a precondition to the present embodiment is also referred to as a CC (Communication Concierge) service, hereinafter.

As illustrated in FIG. 1, the CC service is a service provided to communication terminal devices c1 to c5 being connected to a network N. Any one of a telephone having a telephone call function, a communication terminal device (e.g., a smart phone) connected to the network N and capable of transmitting/receiving texts through packet communication, or a communication terminal device capable of transmitting/receiving both telephone call speech and texts can be used as the communication terminal devices c1 to c5. Moreover, the communication terminal devices c1 to c5 may have functions of transmitting/receiving not only texts but also still images, motion images, and music.

According to the first embodiment, it is assumed that a user of at least one of the communication terminal devices c1 to c5 being connected to the network N and a user of at least another one have a speech communication. The user during a telephone call over a telephone is capable of activating another task during the telephone call to perform the task. Information obtained through the performance of the activated task can be received by the telephone on line for the telephone call or another communication terminal device corresponding to this telephone.

a service server apparatus is necessary for providing the service through different task from a telephone call while the telephone is on line for the telephone call. A service server apparatus for realizing the present embodiment performs tasks of translating the content of a telephone call, synthesizing speeches in accordance with the content of the telephone call after the translation, generating data (hereinafter, also referred to as task data) obtained by inserting synthesized speeches in the telephone call speeches, generating a text of the telephone call content after the translation, and transmitting task data and data converted into a text (hereinafter, also referred to as text data) to a telephone, etc., on line for a telephone call in conjunction with another operation.

The service server apparatus for realizing the first embodiment will be explained in more detail below.

[Service Server Apparatus]

(i) Function

Figure 2:
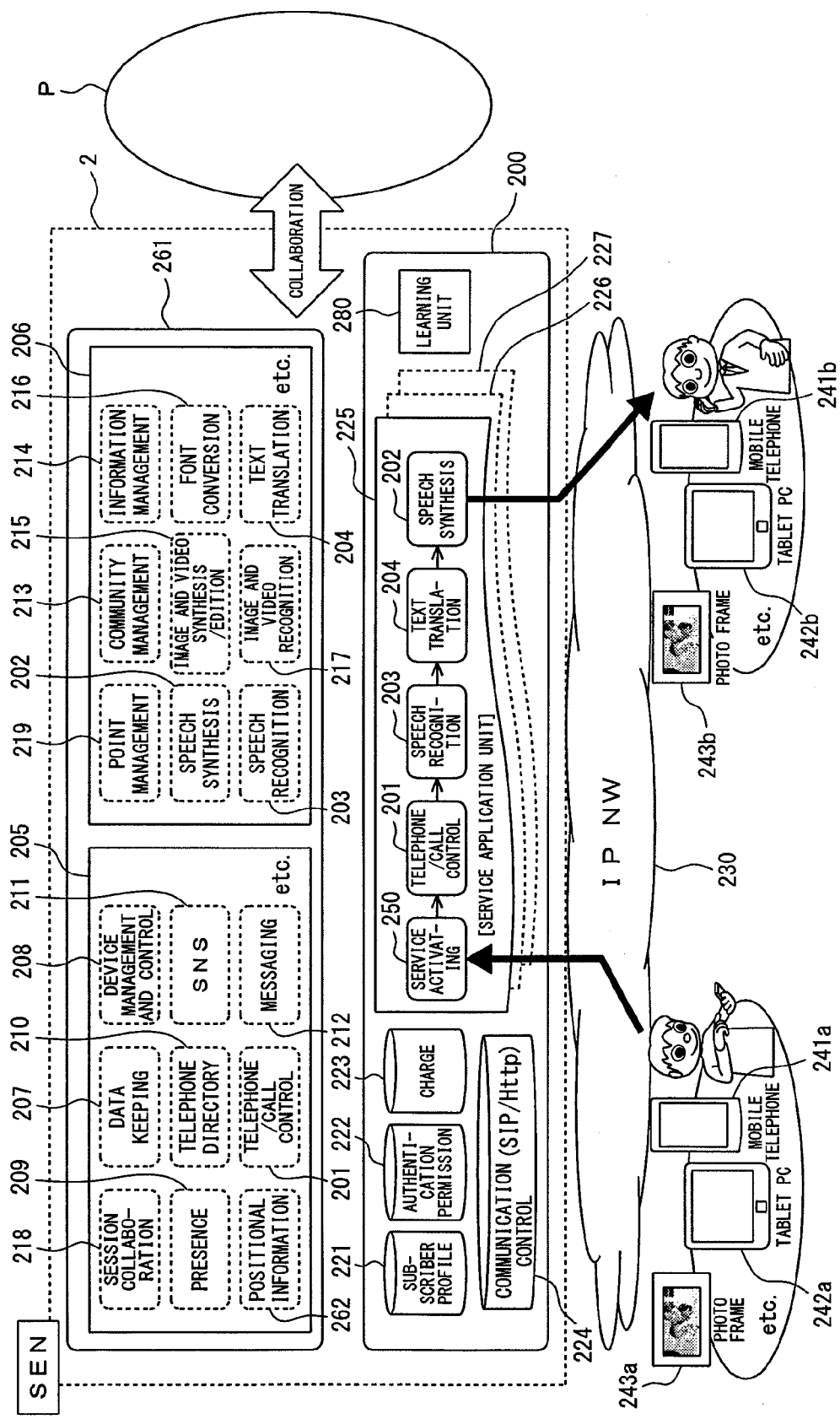
FIG. 2 is a block diagram illustrating an example configuration of a service server apparatus according to the first embodiment of the present invention.

FIG. 2 is a block diagram illustrating a configuration example of a service server apparatus according to the present embodiment. A service server apparatus 200 illustrated in FIG. 2 is configured to communicate with an enabler group 261 including a plurality of enablers. It is to be noted that a term "enabler" means driver software for activating a computer, and indicates software (application) designed for each of intended purposes.

The enabler group 261 includes an enabler group 205 for a telephone function and an enabler group 206 added to realize a translation function that is a specific function according to the present embodiment. The enabler group 205 includes, for example, a session collaborating enabler 218, a data retaining enabler 207, a device management controlling enabler 208, a presence enabler 209, a telephone directory enabler 210, an SNS (Social Networking Service) enabler 211, a positional information detecting enabler 262, a telephone/call control enabler 201, and a messaging enabler 212.

The enabler group 206 includes, for example, a point managing enabler 219, a community managing enabler 213, an information managing enabler 214 for managing predetermined information in accordance with an application, a speech synthesizing enabler 202, an image and video synthesizing/editing enabler 215, a font converting enabler 216, a speech recognizing enabler 203, an image and video recognizing enabler 217, and a text translating enabler 204.

The enabler group 205 for the telephone function is a set of enablers relating to a speech communication. Moreover, the enabler group 206 is a set of enablers different from the application relating to the speech communication. That is, herein, the enablers included in the enabler group 205 are tasks performed by the application relating to a speech communication, while the enablers included in the enabler group 206 are other tasks that are operations performed by a different application from the task performed by the application relating to the speech communication.

The enabler groups 205 and 206 included in the enabler group 261 constitute an environment for providing a service at the network side, i.e., a so-called service enabler network (hereinafter, referred to as an SEN) 2. The SEN 2 is capable of providing various services in collaboration with a plurality of Internet players P capable of providing a plurality of services including a translation service.

According to the first embodiment, in order to perform a task relating to translation, the service server apparatus 200 obtains the telephone/call control enabler 201 in the enabler group 205 and store the obtained enabler in a service application unit. Moreover, the service server apparatus 200 obtains the speech translating enabler 204, the speech recognizing enabler 203, and the text translating enabler 202 from the enabler group 206, and stores those enablers in the service application unit. As explained above, according to the present embodiment, all service application units include a service activating unit 250. As a result, according to the present embodiment, the service application unit serves as a service application unit 225 for providing a service relating to a translation.

The service server apparatus 200 is capable of obtaining a necessary enabler for performing a task in accordance with the type of the service. The enabler obtained by the service server apparatus 200 is stored in the service server apparatus 200 as a service application (service application software) unit for each service, as will be described later.

According to such a configuration, the service server apparatus 200 according to the first embodiment is capable of achieving a necessary application for the service by combining existing enablers. Hence, according to the first embodiment, it is unnecessary to develop a new exclusive application, and a time and a cost for developing an application can be eliminated. Moreover, according to the first embodiment, since the service can be provided using existing applications having practical accomplishments, it becomes possible to provide a service with higher reliability than that of a case where an application is newly developed.

According to the first embodiment, it is assumed that a call-originating communication terminal device 241a and a call-receiving communication terminal device 241b communicate with each other and receive the service from the service server apparatus 200. For providing the service to the call-originating communication terminal device 241a and the call-receiving communication terminal device 241b, the service server apparatus 200 performs a task. The call-originating communication terminal device 241a and the call-receiving communication terminal device 241b in the present embodiment are each, for example, a mobile telephone having both of a function as a telephone and a function of transmitting/receiving texts, still images and motion images, etc.

The service server apparatus 200 includes existing configurations that control a telephone call as a telephone, in addition to the service application unit having an enabler in accordance with the service. The configurations for controlling a telephone call include a subscriber profile storing unit 221 that stores data on a subscriber of the CC service (i.e., a user who receives the CC service, hereinafter, simply referred to as a "user"), an authentication permitting unit 222 that authenticates and permits the request for providing the CC service, a charge process unit 223 that performs a process relating to a charge for a telephone communication, and a communication control unit 224 that controls telephone communication and packet communication. The communication control unit 224 also has a function serving as a providing unit for providing task data to the call-originating communication terminal device 241*a* and the call-receiving communication terminal device 241*b*.

The subscriber profile storing unit 221 registers therein beforehand the kind of the language of the user in association with the name of the user and the telephone number of the telephone used by the user. In addition, the subscriber profile storing unit 221 also registers therein an MSISDN (Mobile Subscriber ISDN Number: a telephone number registered in the SIM card of a telephone) included in a data communication session between the telephones that is information for identifying a telephone. In order to let the above-explained device, such as a tablet PC or a photo frame, to be associated with the telephone, it is appropriate if the identifiers of those devices be registered in the subscriber profile storing unit 221 in association with the telephone number of the corresponding telephone.

The communication control unit 224 provides task data generated by the service server apparatus 200 to the call-originating communication terminal device 241*a* and the call-receiving terminal device 241*b*. The service server apparatus 200 according to the first embodiment includes a learning unit 280. The learning unit 280 will be discussed later.

The service server apparatus 200 may include a plurality of service application units 225, 226, and 227. According to the first embodiment, the plurality of service application units 225, 226, and 227 may be utilized as a memory area capable of storing, for example, a plurality of enablers. When such a configuration is employed, the memory area can be configured to be any one of the service application units 225, 226, and 227 in accordance with the enabler to be stored. The memory area to be the service application unit according to the first embodiment stores the service activating unit 250. The service activating unit 250 has a function of activating the enabler to provide the service by receiving an instruction transmitted from, for example, the call-originating communication terminal device 241*a* through an IP network 230.

According to the first embodiment, when the user operates the call-originating communication terminal device 241*a*, the service activating unit 250 activates the enabler stored in the service application unit 225. When the enabler stored in the service application unit 225 is activated, a task is initiated. The activated telephone/call control enabler 201 records the verbal speeches (hereinafter, referred to as a call speech) of a speaker during the communication between the call-originating communication terminal device 241*a* and the call-receiving communication terminal device 241*b*. Regarding the recording of the call speech, the recording by a well-known answering machine function of the telephone/call control enabler 201 is controlled and the recording may be carried out through the call speech recording function of the answering machine function.

The speech recognizing enabler 203 generates text data from the recorded speeches. The speech recognizing enabler 203 analyzes the recorded speeches through, for example, morphological analyze, and converts the verbal speeches into text data.

The text translating enabler 204 translates the text data generated by the speech recognizing enabler 203 into the language of the user of the call-receiving communication terminal device 241*b*, thereby generating translated text data.

The speech synthesizing enabler 202 converts the translated text data generated by the text translating enabler 204 into speeches represented by sounds, thereby generating speech data to be read out by synthesized sounds.

According to the first embodiment, the speech data generated by the speech synthesizing enabler 202 is provided to the call-originating communication terminal device 241*a* and the call-receiving communication terminal device 241*b* together with a call speech. Moreover, according to the first embodiment, the text data generated by the speech recognizing enabler 203 and the translated text data generated by the text translating enabler 204 are also provided to the call-originating communication terminal device 241*a* and the call-receiving communication terminal device 241*b*. According to the first embodiment, a combination of the speech data, the text data, and the translated text data is also referred to as task data.

As explained above, the speech recognizing enabler 203, the text translating enabler 204, and the speech synthesizing enabler 202 perform a task based on the verbal speeches recorded by the telephone/call control enabler 201 when the service activating unit 250 receives an instruction for performing the task, and task data is generated through the performance of the task. The task data is provided to the call-originating communication terminal device 241*a* and the call-receiving communication terminal device 241*b*.

In the service server apparatus according to the first embodiment employing the above-explained configuration, the service activating unit 250 functions as an instruction receiving unit. Moreover, the telephone/call control enabler 201 functions as a recording unit, and the speech recognizing enabler 203, the text translating enabler 204, and the speech synthesizing enabler 202 function as a task performing unit and a task data generating unit.

According to the first embodiment, the service activating unit 250 does not immediately activate each enabler when the call-originating communication terminal device 241*a* and the call-receiving communication terminal device 241*b* instruct the provision of the service, but instead may obtain subscriber information registered beforehand in the subscriber profile storing unit 221. Next, when the subscriber information includes information that identifies at least one of the call-originating communication terminal device 241*a* and the call-receiving communication terminal device 241*b*, the service activating unit may receive the instruction from the call-originating communication terminal device 241*a* or the call-receiving communication terminal device 241*b*.

According to the first embodiment, when the provision of the service is instructed, the activating condition of the service activating unit 250 may be set in such a way that a mobile telephone makes a telephone call while adding information like a specific number set beforehand to the telephone number of the local mobile telephone. When the activating condition is set in this manner, the service activating unit 250 receives the instructions from the call-originating communication terminal device 241*a* and the call-receiving communication terminal device 241*b* when at least one of the call-originating communication terminal device 241*a* and the call-receiving communication terminal device 241*b* makes a telephone call using the telephone number to which the information is added beforehand.

The first embodiment is not limited to a case where the service activating unit 250 activates each enabler in accordance with signals output by the operation on the call-originating communication terminal device 241*a* and the call-receiving communication terminal device 241*b*. For example, when the call speech recorded by the telephone/call control enabler 201 is input, the service activating unit 250 may activate each enabler to start performing the task. When the service activating unit 250 is configured in this manner, terms that can identify an application like "honyaku kaishi (Japanese) start translation" are set beforehand. Next, when the call speech recorded by the speech recognizing enabler 203 is subjected to morphological analyze and only when the term set beforehand is included in the call speech, the service activating unit 250 activates each enabler to perform a task.

According to the first embodiment explained above, the call-originating communication terminal device 241*a* and the call-receiving communication terminal device 241*b* are not limited to mobile telephones that can transmit texts. When the call-originating communication terminal device 241*a* and the call-receiving communication terminal device 241*b* are telephones having only the telephone call function, the performance result of the task may be transmitted to tablet PCs 242*a* and 242*b* and photo frames 243*a* and 243*b* associated beforehand with the telephone in accordance with a request from the telephone having only the telephone call function.

(ii) Learning Unit

Figure 3:
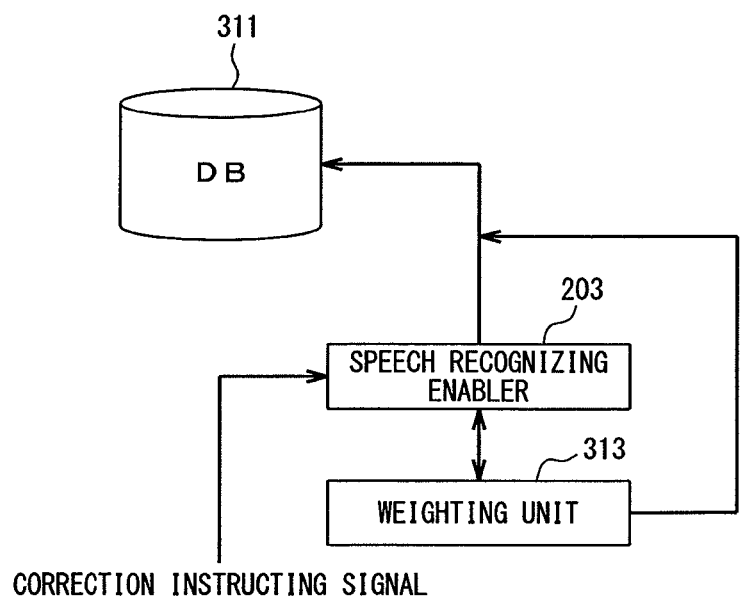
FIG. 3 is a functional block diagram for explaining a learning unit illustrated in FIG. 2.

FIG. 3 is a functional block diagram for explaining the learning unit 280 illustrated in FIG. 2. The learning unit 280 illustrated in FIG. 2*n* includes a weighting unit 313. The speech recognizing enabler 203 illustrated in FIG. 2 is configured to be capable of accessing a database (hereinafter, referred to as a DB) 311. The DB 311 may be arranged in the service server apparatus, or may be connected to the service server apparatus via a network, etc.

According to the first embodiment, the DB 311 registers beforehand a large number of texts, and the speech recognizing enabler 203 accesses the DB 311 to obtain texts corresponding to the call speech having undergone morphological analysis. Next, the speech recognizing enabler converts the call speech into texts using the obtained texts, and generates text data. The text data is transmitted to the call-originating communication terminal device 241*a* and the call-receiving communication terminal device 241*b* as a piece of task data.

In the call-originating communication terminal device, the user checks the text data, so that a false recognition of the call speech and a mistranslation inherent thereto can be detected with ease. When a false recognition or a mistranslation occurs, according to the first embodiment, the user edits the text data displayed on a display screen of the call-originating communication terminal device to indicate a part that should be corrected, and provides the text data to the service server apparatus 200 and instructs the service server apparatus to correct the text data. Such an instruction for a correction can be easily implemented by the existing configuration of a mobile telephone capable of transmitting/receiving text and images.

When the call-originating communication terminal device 241*a* transmits a correction instructing signal for instructing a correction, the correction instructing signal reaches the speech recognizing enabler 203. The speech recognizing enabler 203 notifies the weighting unit 313 of the transmission of the correction instructing signal from the call-originating communication terminal device and the correction-target part instructed by the correction instructing signal. The weighting unit 313 accesses the DB 311, and changes the weight given to the text so as to be lowered for the call speech corresponding to the text having a correction instruction.

When the speech recognizing enabler 203 checks a call speech with the DB 311 next time, the text having a larger weight given preferentially matches a call speech. This makes it possible to extract a text having a higher possibility of matching the call speech within a shorter time.

Figure 4:
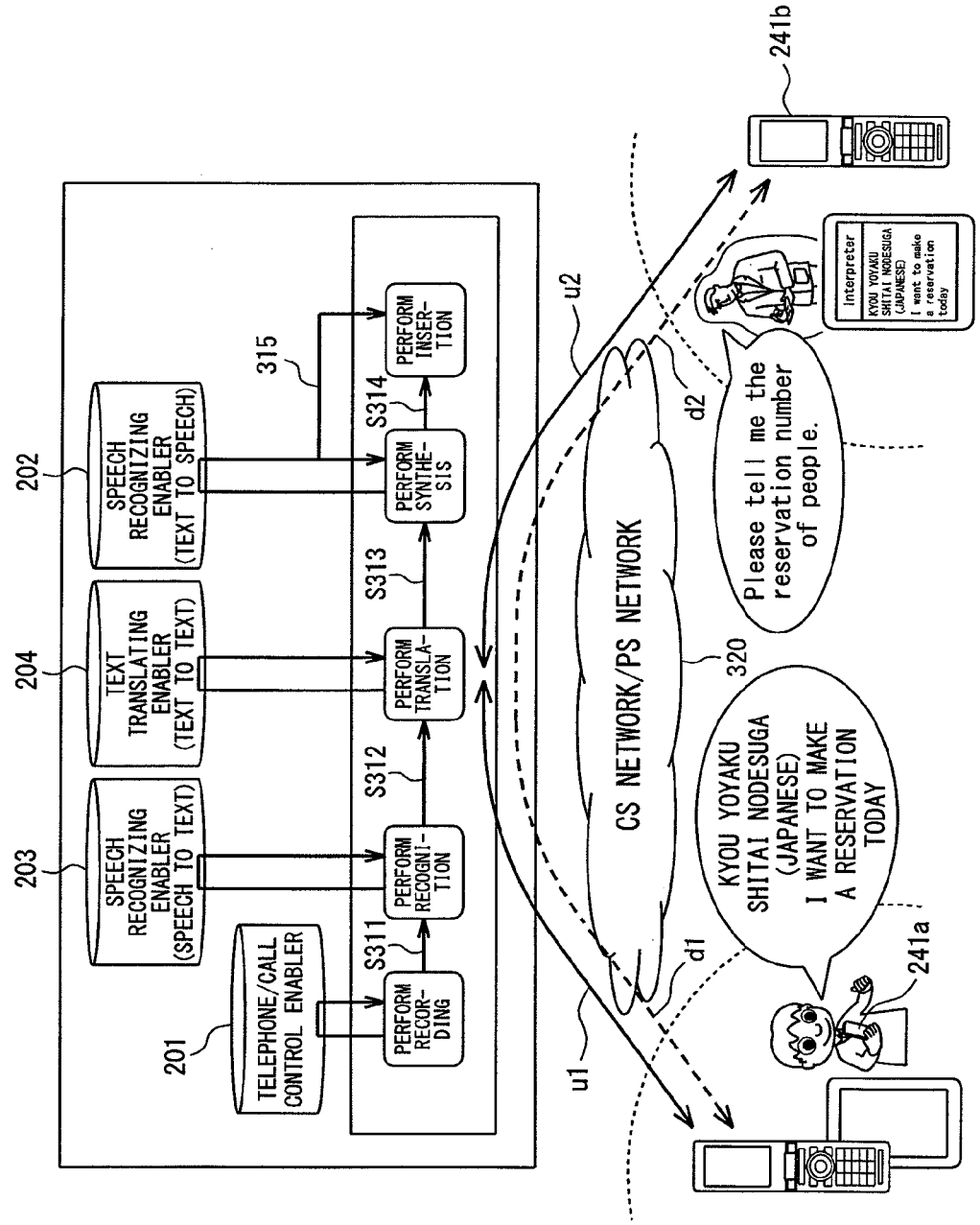
FIG. 4 is a diagram for explaining a procedure of a process performed by the service server apparatus illustrated in FIG. 2.

FIG. 4 is a diagram for explaining the procedure of the process performed by the service server apparatus illustrated in FIG. 2.

The service application unit 225 illustrated in FIG. 2 performs recording of a call speech through the telephone/call control enabler 201 illustrated in FIG. 2 (step S311). The recording of the call speech is performed with a call speech uttered from a condition on which no speech is recorded (hereinafter, also referred to as a silent recording condition) to a next silent recording condition being as a unit of recording. Next, the speech recognizing enabler 203 performs a morphological analysis to analyze verbal speeches. The analysis is performed for each call speech recorded as a unit. Subsequently, the call speech is converted into text data in accordance with the analysis result (step S312).

Next, the service application unit 225 causes the text translating enabler 204 to translate the text data converted in the step S312 into the translated text data of the language registered beforehand in the subscriber profile storing unit 221 by the user of the call-receiving communication terminal device 241*b* (step S313). The translated text data that have been translated is converted into synthesized speeches, and becomes speech data (step S314). Moreover, the speech data is inserted in the call speech (step S315).

The description "insert speech data into a call speech" means to determine a timing of transmitting the speech data in synchronization with the call speech. By determining the transmitting timing of the speech data in this manner, the call speech is transmitted to the call-originating communication terminal device 241*a* and the call-receiving communication terminal device 241*b* through a CS (Circuit Switched) network as normal.

Moreover, the speech data is transmitted to the call-originating communication terminal device 241*a* and the call-receiving communication terminal device 241*b* through data communication sessions via the CS network, but can be transmitted through a PS (Packet Switched) network. However, the transmission through the CS network enables a transmission of the speech data in a real-time manner according to the first embodiment. Furthermore, the text data converted into texts by translating the call speech is transmitted through the PS network. In FIG. 4, the CS network and the PS network are indicated by a reference numeral 320.

Furthermore, the first embodiment is not limited to the case where the call speech is transmitted through the CS network. The call speech may be transmitted to the call-originating communication terminal device 241*a* and the call-receiving communication terminal device 241*b* through the PS network.

According to the first embodiment, as explained above, the call speech uttered from a silent recording condition to the next silent recording condition is recorded, recognized and translated as a unit of recording to generate task data, and every time the task data is generated, the task data is transmitted to the call-originating communication terminal device 241*a* and the call-receiving communication terminal device 241*b*. Accordingly, the call speech and the task data can be transmitted to the call-originating communication terminal device 241*a* and the call-receiving communication terminal device 241*b* in a synchronized manner.

According to the first embodiment, in order to avoid a strange feel of a telephone call, the call speech is transmitted from the call-originating communication terminal device 241*a* to the call-receiving communication terminal device 241*b* that is a communication side in a real-time manner as normal. Hence, when the speech data is inserted into the call speech, the user may listen to the speech on the basis of the speech data in a manner overlapping the call speech. When, however, the users have a conversation through an interpreter, in general, a person tends to avoid uttering from his/her side while the interpreter is uttering. Hence, it is not likely to occur that verbal speeches on the basis of the speech data overlap the call speech and such an overlap makes the conversation difficult.

According to the first embodiment, both call-originating communication terminal device 241a and call-receiving communication terminal device 241b access the service application unit 225 to obtain text data, translated text data, and speech data. The method of connecting the call-originating communication terminal device 241a and the call-receiving communication terminal device 241b through the service application unit 225 is called bridge connection.

Moreover, the service server apparatus 200 illustrated in FIG. 1 can identify the telephone line of the call-originating communication terminal device 241a and that of the call-receiving communication terminal device 241b through a well-known method. Hence, the service server apparatus can distinguish an up link u1 of the call-originating communication terminal device 241a and a down link d1 thereof, an up link u2 of the call-receiving communication terminal device 241b and a down link d2 thereof. Thus, the service server apparatus can translate the uttered speech of the user and transmit the translation to the called side appropriately.

According to the above-explained first embodiment, a call speech, speech data of synthesized speeches, text data, and translated text data can be provided to the call-originating communication terminal device 241a and the call-receiving communication terminal device 241b. Hence, the user is able to easily recognize how the service server apparatus 200 has recognized the content of the uttered speech made by the user himself/herself, and is able to quickly correspond to a mistranslation, etc., like correction of such a mistranslation. Moreover, the user is able to listen to both call speeches from the called side and the speech data obtained by translating the call speeches, and thus a conversation with a realistic feel as if the conversation were being made through an interpreter therebetween is realized.

(iii) CS Network and PS Network

Figure 5:
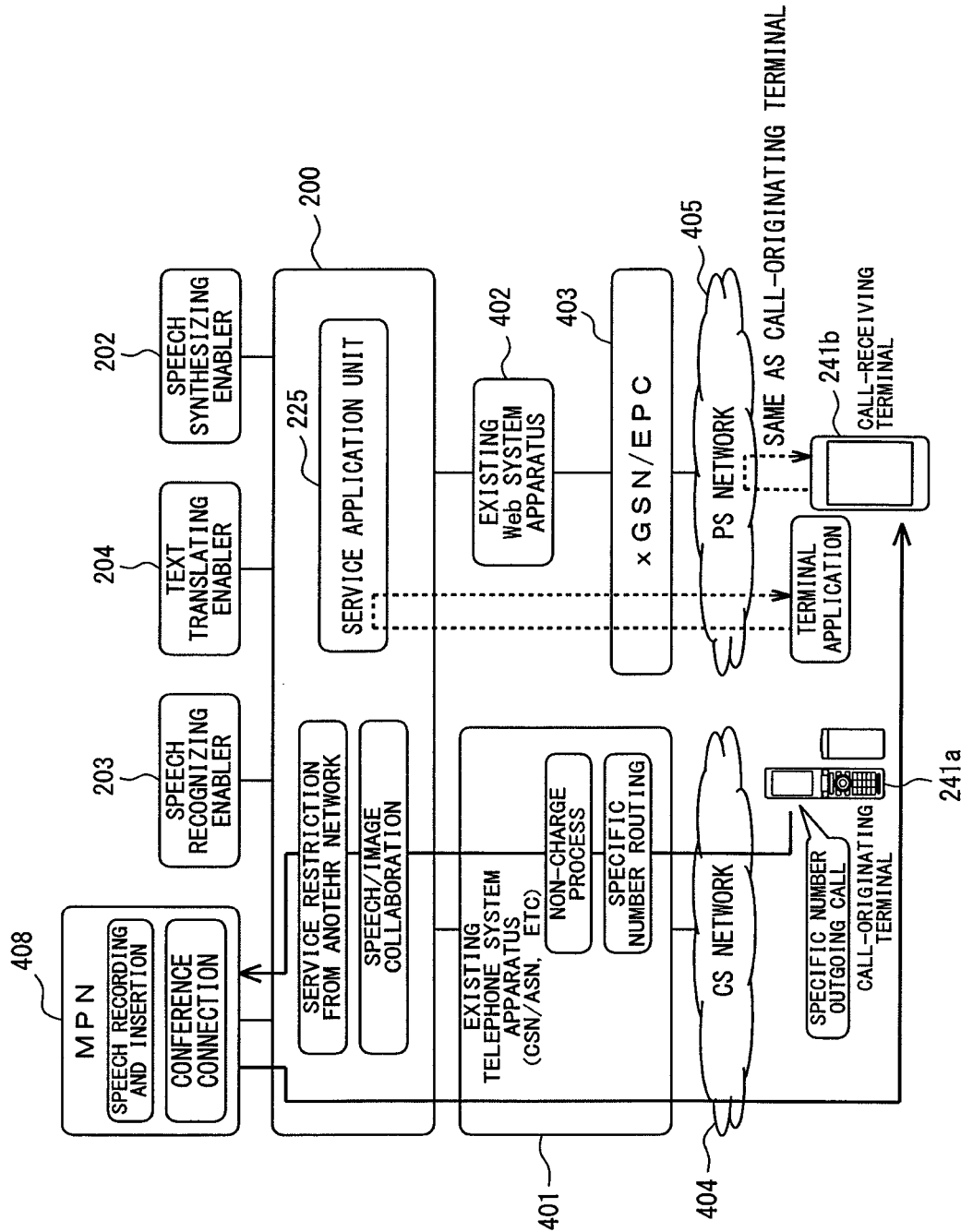
FIG. 5 is a diagram for specifically explaining a CS network and a PS network for connecting the service server apparatus illustrated in FIG. 2 and FIG. 4 with a call-originating communication terminal device and a call-receiving communication terminal device.

FIG. 5 is a diagram for specifically explaining a CS network 404 and a PS network 405 for connecting the service server apparatus 200 with the call-originating communication terminal device 241a and the call-receiving communication terminal device 241b. The same structures in FIG. 5 as those of FIG. 2 and FIG. 4 will be denoted and indicated by the same reference numerals, and some of the explanation thereof will be omitted.

The call-originating communication terminal device 241a makes a telephone call to an MPN (Media Processing Node) 408. This outgoing call signal reaches the CS network 404 and an existing telephone system apparatus 401. The existing telephone system apparatus 401 indicates, for example, a CSN (e.g., an authentication apparatus, a home agent for realizing a hand-over, and a DHCP server), and an ASN (e.g., a wireless base station). The existing telephone system apparatus 401 performs a non-charge process and a specific-number routing process on the outgoing call. The non-charge process is a process of not performing a charge process that is necessary for a telephone call in general. Moreover, the specific-number routing is to change the communication route to a communication route where a process different from the original process is performed when a telephone call is made to a telephone number (a specific number) set beforehand.

Next, the call signal reaches the service server apparatus 200 according to the first embodiment from the existing telephone system apparatus 401. Since the service server apparatus 200 includes the communication control unit 224 for controlling a communication between telephones illustrated in FIG. 1, the subscriber profile storing unit 221, the authentication permitting unit 222, and the charge process unit 223, such configurations perform processes of restricting a service from another network and linking verbal speeches with screens (association of speech data with text data, etc.).

The association of speech data with text data and translated text data is realized as follows.

That is, when the telephone that can receive the service is on line, the communication control unit 224 of the service server apparatus 200 starts monitoring the performance of a data communication session including an MSISDN that matches the MSISDN included in the signal relating to a telephone call made by the telephone. Next, when a data session that matches the MSISDN including in the signal relating to a telephone call is made, it is determined that the telephone call and the data session should be linked with each other in the CC service.

When a call speech, speech data, text data, and translated text data are transmitted to a single communication terminal device, the call speech and the speech data are transmitted in a real-time manner through the CS network. However, the speech data can be transmitted through the PS network. According to the above-explained configuration, the call speech transmitted through the CS network 404 and the task data transmitted through the PS network 405 can be linked with each other.

Figure 6:
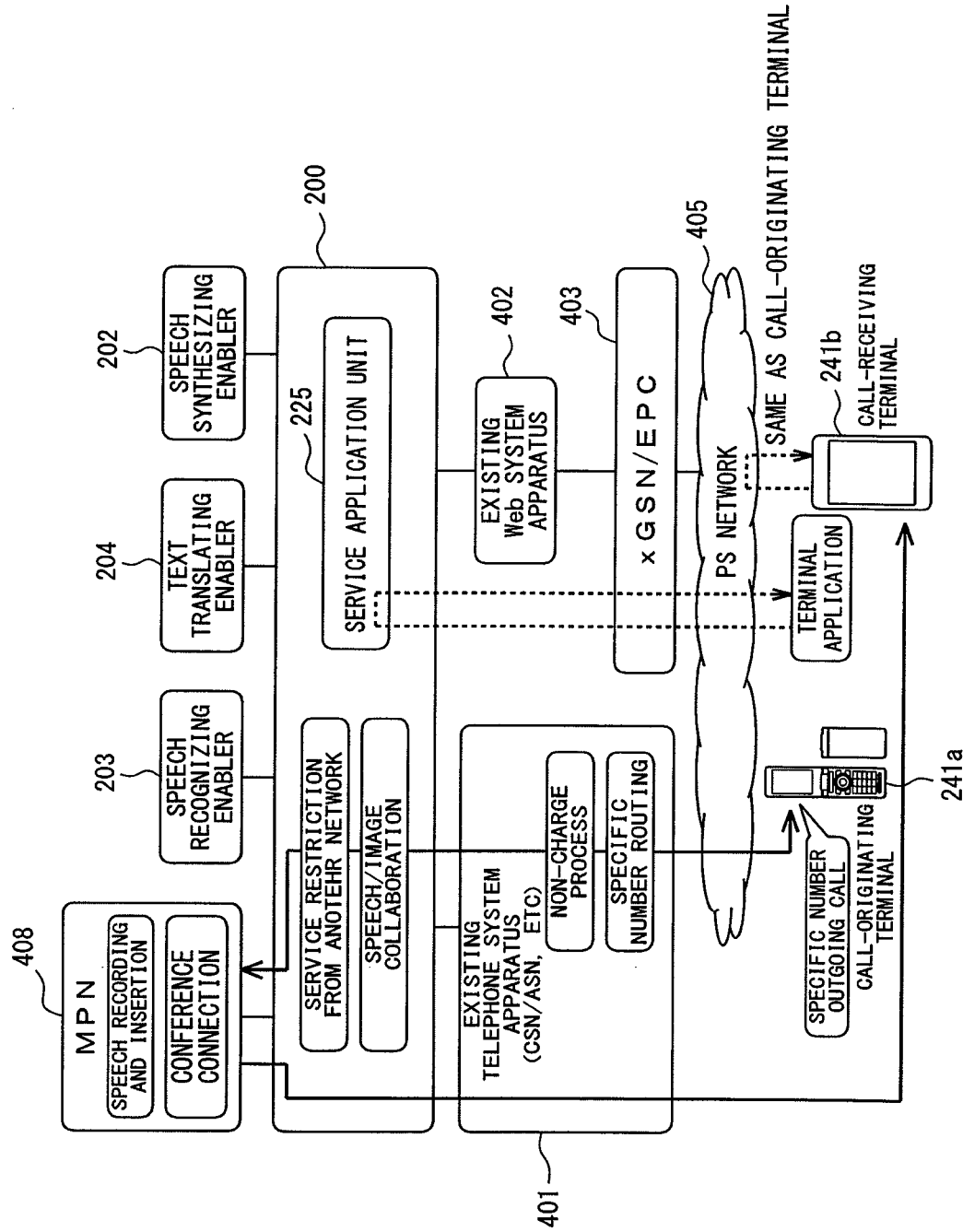
FIG. 6 is a diagram for specifically explaining a PS network for connecting the service server apparatus illustrated in FIG. 2 and FIG. 4 with the call-originating communication terminal device and the call-receiving communication terminal device.

As explained above, according to the first embodiment, the call speeches can be transmitted through the PS network 405 like the speech data. FIG. 6 illustrates a configuration of transmitting the call speech through the PS network 405 together with the speech data, etc.

According to the first embodiment, in the subscriber profile storing unit 221 illustrated in FIG. 2, as explained above, the telephone having only the call function is registered in association with the communication terminal device that is capable of transmitting texts, etc. In this case, when a telephone call is made with the telephone number of the telephone, the communication control unit 224 may transmit a URL where task data can be obtained to the address of the registered communication terminal device.

Call speeches corresponding to the outgoing call are recorded by the telephone/call control enabler 201 in the MPN 408, and transmitted to the service server apparatus 200.

In the service server apparatus 200, the application unit 225 generates speech data, text data and translated text data based on the call speeches recorded by the application unit 225. The speech data is transmitted in a real-time manner to the call-receiving communication terminal device 241b through the CS network, but can be transmitted through the PS network. Moreover, the text data and the translated text data are transmitted to the call-receiving communication terminal device 241b through the PS network 405 via an existing Web system apparatus 402 (e.g., a gateway), and an xGSN (x-GPRS Support Node)/EPC (Evolved Packet Core).

(iv) Service Providing Method

Figure 7:
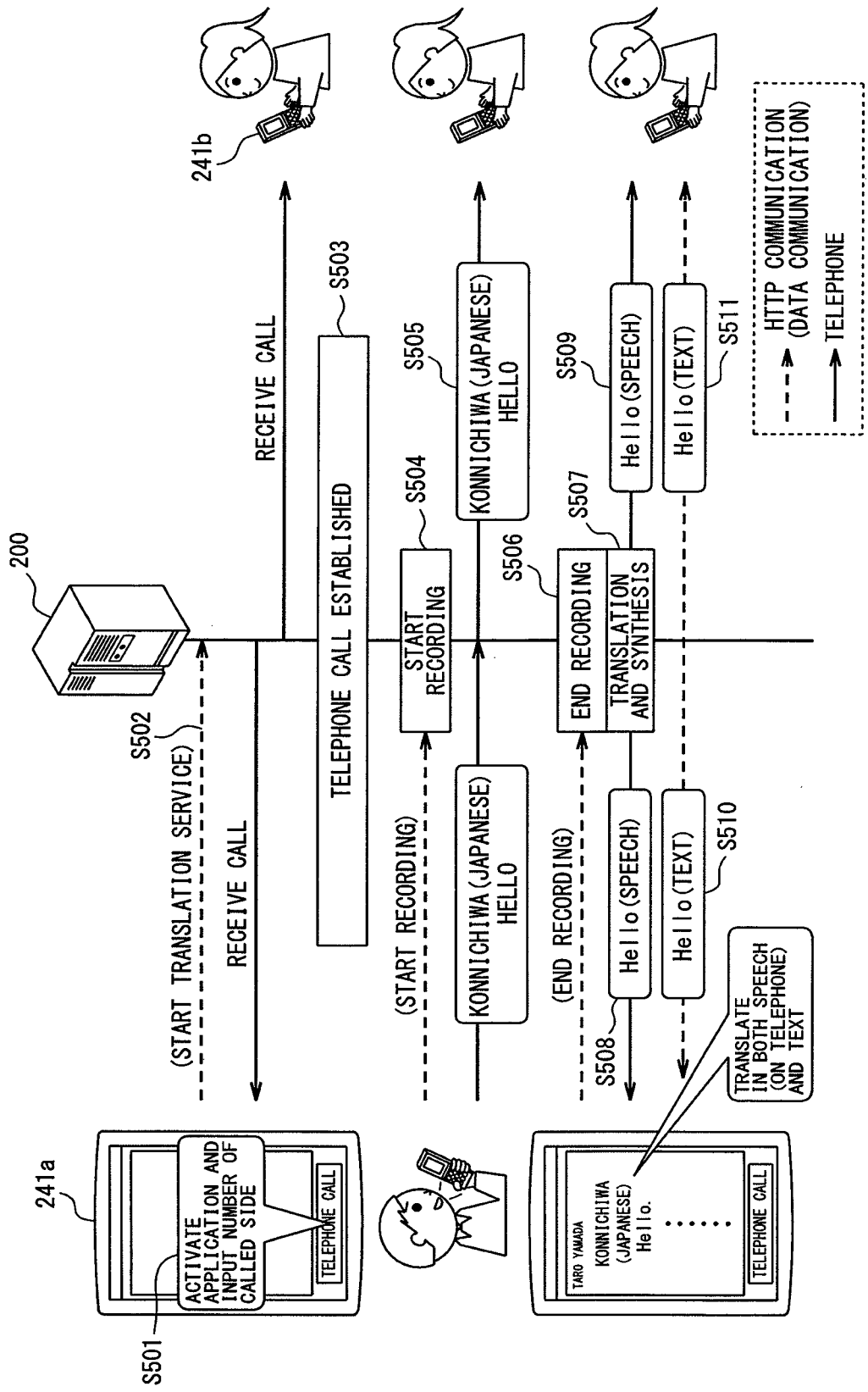
FIG. 7 is a diagram for explaining a service providing method realized by the service server apparatus according to the first embodiment.

FIG. 7 illustrates a diagram for explaining a service providing method realized by the service server apparatus 200 according to the first embodiment. In FIG. 7, a data communication through the HTTP (Hypertext Transfer Protocol) is indicated by a dashed line, while a telephone call through telephones is indicated by a continuous line.

In the call-originating communication terminal device 241a, for example, the user activates an application for realizing the service providing method according to the first embodiment, and inputs a telephone number of a side to be called (step S501). The address of the call-originating communication terminal device 241a is transmitted to the service server apparatus from the call-originating communication terminal device 241a through such a process. Next, the service server apparatus 200 receives an instruction of performing a task during the communication (the telephone call) upon satisfaction of other necessary requirements, and starts the translation service (step S502).

The service server apparatus 200 establishes a communication line between the call-originating communication terminal device 241a and the call-receiving communication terminal device 241b (step S503). Next, the service server apparatus 200 records the call speech transmitted from the line of the call-originating communication terminal device 241a (step S504), and transmits the recorded speeches to the line of the call-receiving communication terminal device 241b (step S505).

When it becomes the silent recording condition in which no call speech is transmitted from the line of the call-originating communication terminal device 241a, the service server apparatus 200 once terminates the recording of the call speech transmitted from the line of the call-originating communication terminal device 241a (step S506). Next, the speech recognizing enabler 203, the text translating enabler 204, and the speech synthesizing enabler 202 all illustrated in FIG. 2 and FIG. 4 convert the recorded call speech into texts, translate the recorded call speech, and synthesize synthesized speeches (step S507), thereby generating speech data, text data, and translated text data.

Next, the service server apparatus 200 according to the first embodiment transmits the speech data to both of the call-originating communication terminal device 241a and the call-receiving communication terminal device 241b, and also transmits the text data and the translated text data to both of the call-originating communication terminal device 241a and the call-receiving communication terminal device 241b (steps S508 to 511). Subsequently, when the user of the call-receiving communication terminal device 241b starts uttering, the service server apparatus 200 performs the above-explained operations on the call speech of the user transmitted from the telephone line of the call-receiving communication terminal device 241b. When one user between the two users utters while the other user is uttering, according to the first embodiment, the above-explained processes are performed on the call speech of the user having the call speech being recorded, and the content of the talk uttered by another user is not subjected to the processes.

Figure 8:
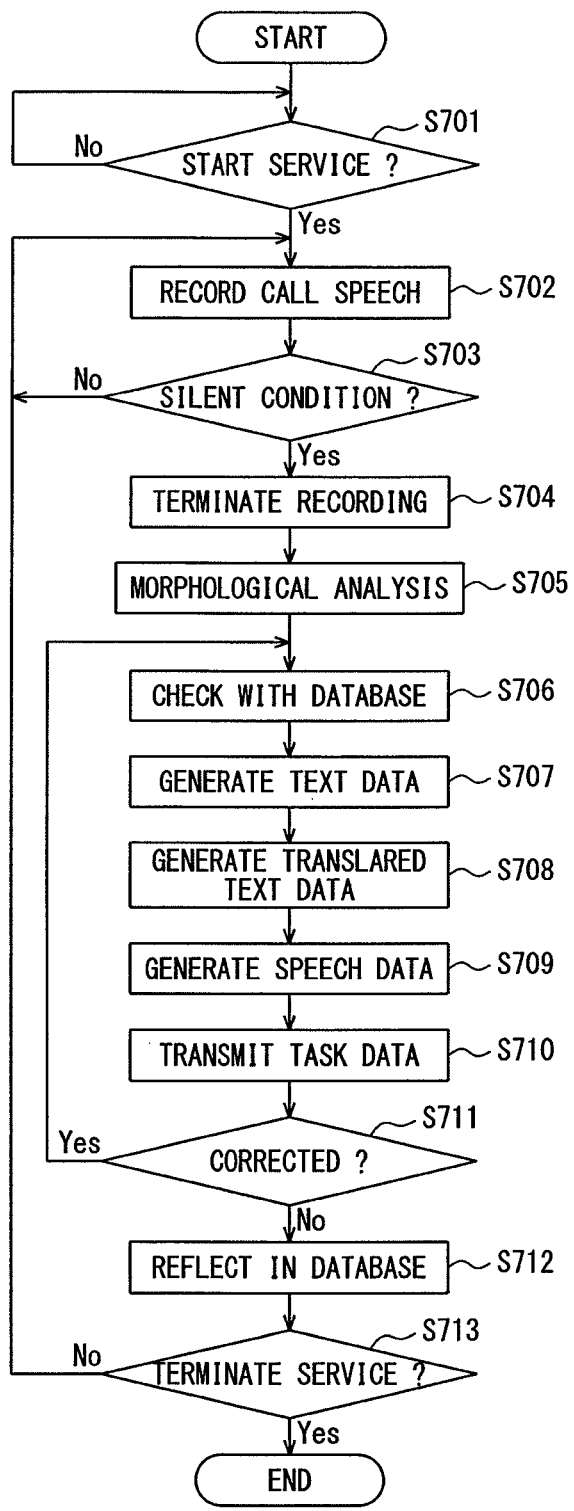
FIG. 8 is a flowchart for explaining the service providing method according to the first embodiment.

FIG. 8 is a flowchart for explaining the service providing method according to the first embodiment performed by the service server apparatus according to the first embodiment. The service activating unit determines whether or not the performance of an application relating to a translation is instructed from the call-originating communication terminal device (step S701). When determining that the performance of the application is instructed (step S701: YES), the service activating unit activates each enabler in the service application unit. When determining that no such an instruction is given (step S701: NO), the service activating unit stands by until the performance of the application is instructed.

The telephone/call control enabler activated by the service activating unit records the call speech (step S702). The telephone/call control enabler determines whether or not it becomes a silent condition during the recording of the call speech (step S703). When determining that it becomes the silent condition (step S703: YES), the telephone/call control enabler once terminates recording of the call speech (step S704). The speech recognizing enabler performs a morphological analysis on the call speech recorded by the telephone/call control enabler (step S705), and checks the analysis result with the DB 311 illustrated in FIG. 3 (step S706). Next, texts that match the call speech are extracted and combined together to generate text data (step S707).

The text recognizing unit 204 translates the text data into another language to generate translated text data (step S708). The speech synthesizing enabler converts the translated text data into synthesis speeches to generate speech data (step S709). The text data, the translated text data, and the speech data are transmitted as task data to the call-originating communication terminal device and the call-receiving communication terminal device (step S710).

The speech recognizing enabler determines whether or not the text data has been corrected by the user based on whether or not a correction instructing signal has been transmitted (step S711). When the text data has been corrected (step S711: YES), the speech recognizing enabler checks again the call speech corresponding to the corrected text with the DB, and converts the call speech in other texts. Subsequently, text data is generated using the other texts. The text translating enabler and the speech synthesizing enabler generate again translated text data and speech data based on the re-generated text data (steps S706 to 711).

Conversely, when the speech recognizing enabler determines that no correction instructing signal is not input (step S711: YES), the learning unit 280 illustrated in FIG. 2 changes the weight given to the text data stored in the DB. That is, the learning unit 280 changes the weight of the text corrected this time to be lowered, and reflects the content subjected to the change in the DB. After the above-explained processes, the service activating unit determines whether or not the user has instructed the termination of the service (step S713).

When determining that the user has not instructed the termination of the service (step S713: NO), the service activating unit causes the telephone/call control unit to keep recording the call speech. Conversely, when determining that the user has instructed the termination of the service (step S713: YES), the service activating unit terminates the service in accordance with the instruction.

The first embodiment is not limited to the above-explained configuration. That is, in the above-explained first embodiment, the CC service relating to a translation is performed for a telephone call made between the two users. The first embodiment is, however, not limited to a telephone call between the two users, and can be applied to a telephone conference, etc., among three or more persons to have a conversation over the telephone.

(Service Providing Program)

The service server apparatus explained above performs a service providing program for providing a service by a different task from a speech communication during the speech communication between speech communication terminal devices capable of communicating with each other via speeches. The service providing program is a program that allows a computer to realize: an instruction receiving function of receiving an instruction for performing the different task during the speech communication; a recording function of recording the speeches of a speaker during the communication between the plurality of speech communication terminal devices; a task performing function of converting the call speech into text to generate text data based on the call speech recorded by the recording function when the instruction receiving function receives the instruction, of translating the text data in another language to generate translated text data, and of converting the translated text data into speeches to generate speech data; and a task data providing function of providing, together with the call speech, the text data, the translated text data, and the speech data as the task data to each of the plurality of speech communication terminal devices performing the speech communication.

Second Embodiment

Next, an explanation will be given of a second embodiment of the present invention. The second embodiment is a case where a service server apparatus, a service control method, and a service control program according to the present invention are applied to an application for adjusting the schedule of a user.

(Scheduler Application)

Figure 9:
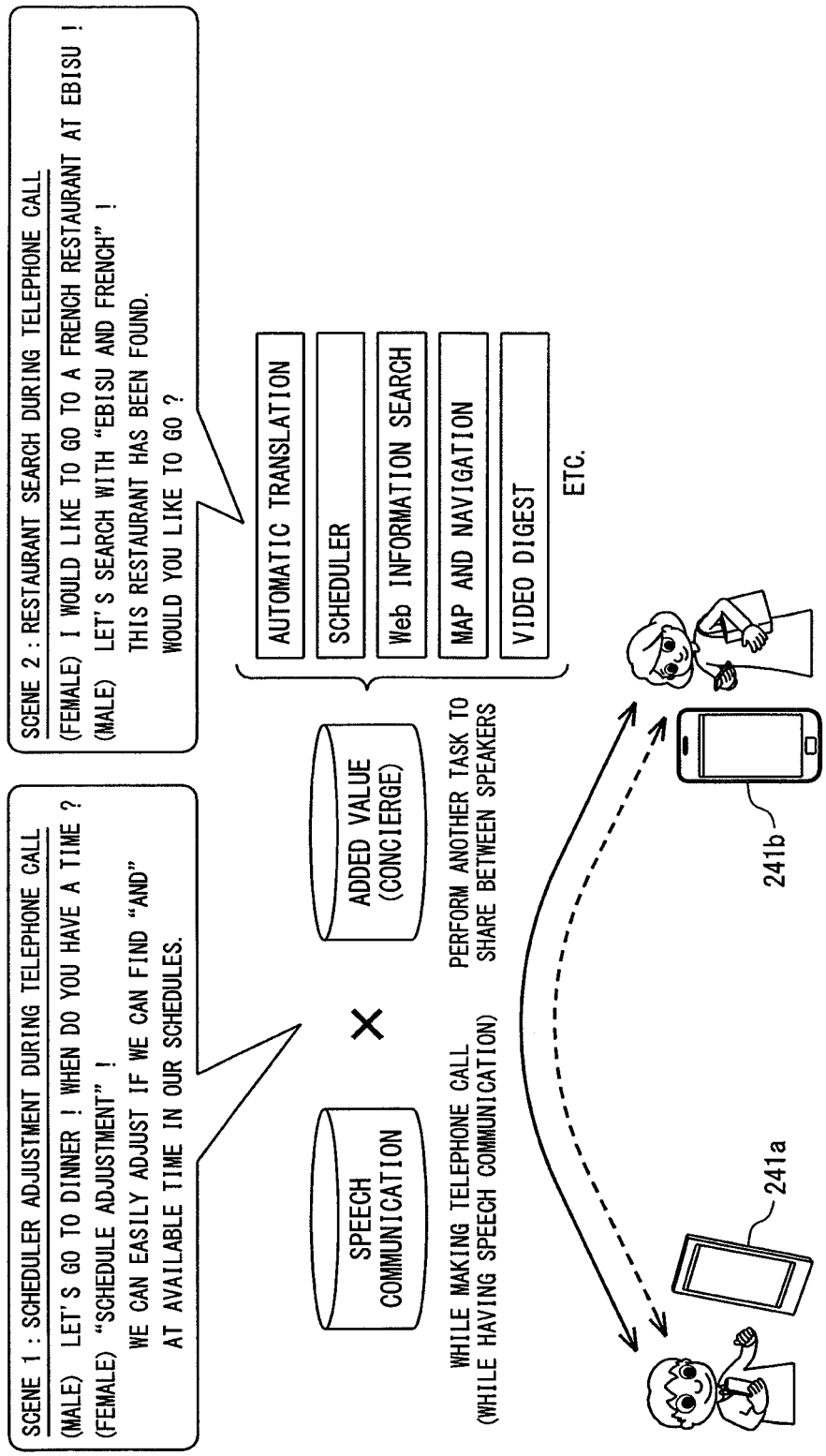
FIG. 9 is a diagram for explaining an outline of a scheduler application according to a second embodiment.

FIG. 9 is a diagram for explaining an outline of the application (hereinafter, referred to as a scheduler application) for adjusting a schedule and is implemented by the second embodiment. In the example case illustrated in FIG. 8, the service server apparatus provides a service by a different scheduler task from the communication via a speech during the communication between the call-originating communication terminal device 241a and the call-receiving communication terminal device 241b. According to such an example case, for example, the user of the call-originating communication terminal device 241a operates the call-originating communication terminal device 241a to instruct the service server apparatus to perform the scheduler task during a telephone call. When receiving the instruction, the service server apparatus starts recording the call speeches of the users of the call-originating communication terminal device 241a and the call-receiving communication terminal device 241b during the communication.

In the example case illustrated in FIG. 9, the service server apparatus obtains the call speeches from the telephone lines of the call-originating communication terminal device 241a and the call-receiving communication terminal device 241b, and records respective call speeches, respectively. The speech recognizing unit illustrated in FIG. 2 performs, for example, a morphological analysis on the recorded call speech, and detects that the call speech includes a verbal speech meaning "schedule adjustment". Since the call speech includes "schedule adjustment", it is determined that an instruction for performing a task is given to extract a date and hour and a time slot thereof available for both schedules of the users of the call-originating communication terminal device 241a and the call-receiving communication terminal device 241b.

When such an instruction is given, according to the second embodiment, the service server apparatus obtains schedule data of the users registered in the call-originating communication terminal device 241a and the call-receiving communication terminal device 241b. Note that the schedule data is data registered in the call-originating communication terminal device 241a or the call-receiving communication terminal device 241b by the user himself/herself, and is data including information on the activity of the user and the date and hour at which such an activity is to be carried out.

The service server apparatus according to the second embodiment extracts the common day and the time slot thereof (date and hour) having no user activity registered in the call-originating communication terminal device 241a and the call-receiving communication terminal device 241b, from the obtained schedule data. The extracted data and hour are transmitted as image data including text data to both call-originating communication terminal device 241a and the call-receiving communication terminal device 241b.

(Service Server Apparatus)
(i) Function

Figure 10:
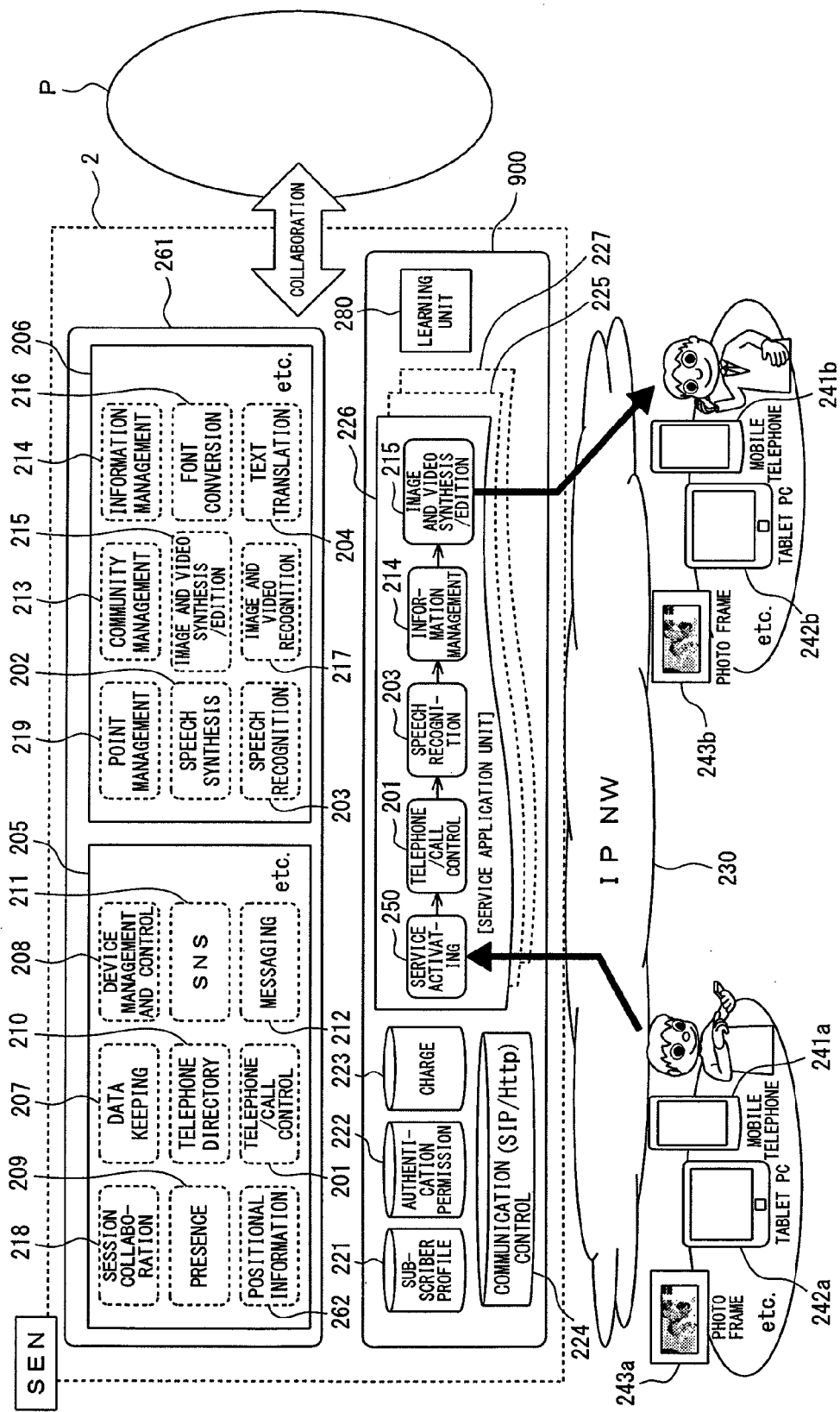
FIG. 10 is a diagram for explaining a service server apparatus according to the second embodiment.

FIG. 10 is a diagram illustrating a service server apparatus 900 according to the second embodiment. The service server apparatus 900 according to the second embodiment is different from the service server apparatus 200 according to the first embodiment only in the configuration of the service application unit. That is, in the service server apparatus 900 according to the second embodiment, the telephone/call control enabler 201, the speech recognizing enabler 203, the information managing enabler 214, and the image and video synthesizing/editing enabler 215 all obtained from the enabler group 261 constitute a service application unit 226.

Next, the information managing enabler 214 obtains the schedule data of the user registered in the call-originating communication terminal device 241a and the call-receiving communication terminal device 241b. The information managing enabler 214 extracts a date and a time slot at which no schedule of both users of the call-originating communication terminal device 241a and the call-receiving communication terminal device 241b is registered, from the obtained schedule data.

Information extracted by the information managing enabler 214 is given to the image and video synthesizing/editing enabler 215. The image and video synthesizing/editing enabler 215 generates task data including at least one of texts and images from such information. FIG. 11 is a diagram illustrating task data according to the second embodiment. The task data is transmitted to both call-originating communication terminal device 241a and call-receiving communication terminal device 241b.

According to such a configuration, it becomes possible to provide, to the users of the call-originating communication terminal device 241a and the call-receiving terminal device 241b, a communication having a realistic feel as if both users were seeing each other face to face and adjusting the schedule. Moreover, an advantage of enabling both users to easily and surely adjust the schedule is obtainable.

(ii) Service Providing Method

Figure 12:
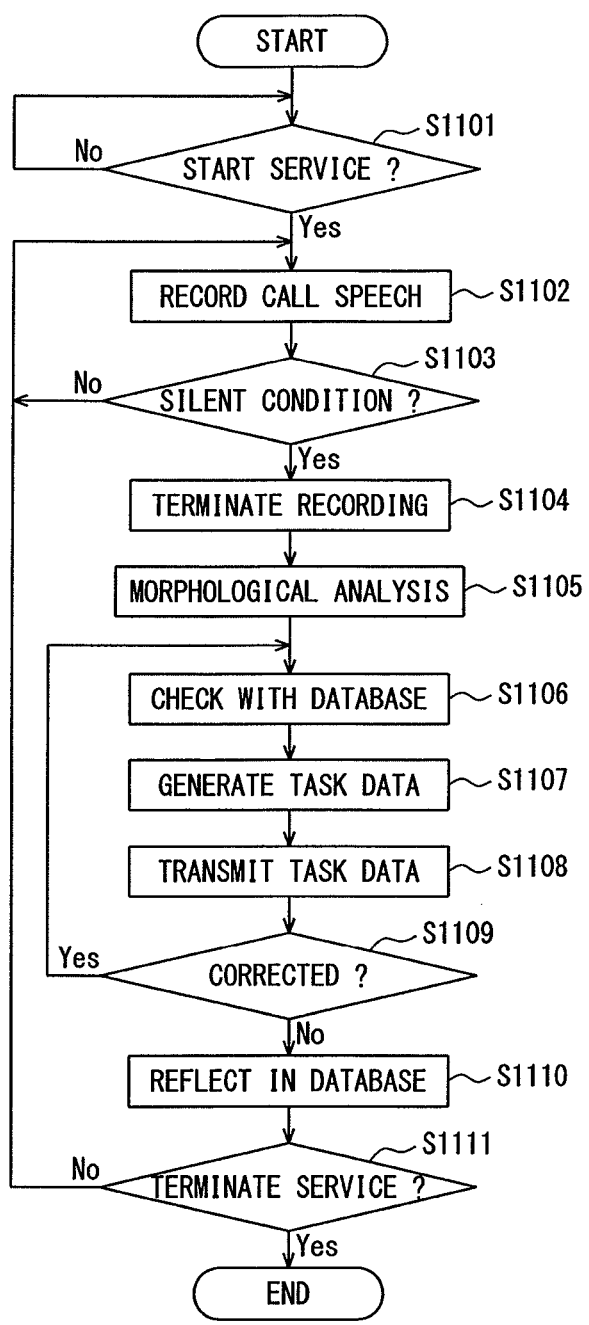
FIG. 12 is a flowchart for explaining a service providing method according to the second embodiment.
Figure 13A:
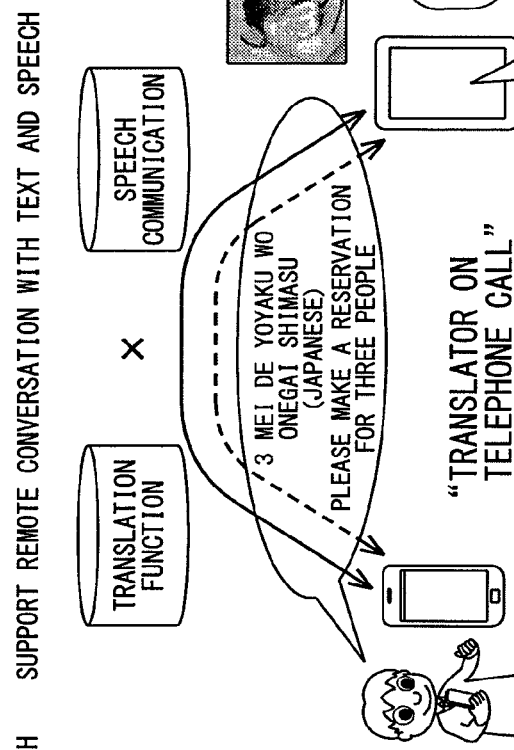
FIG. 13A is a diagram for explaining a configuration of a typical translator.
Figure 13B:
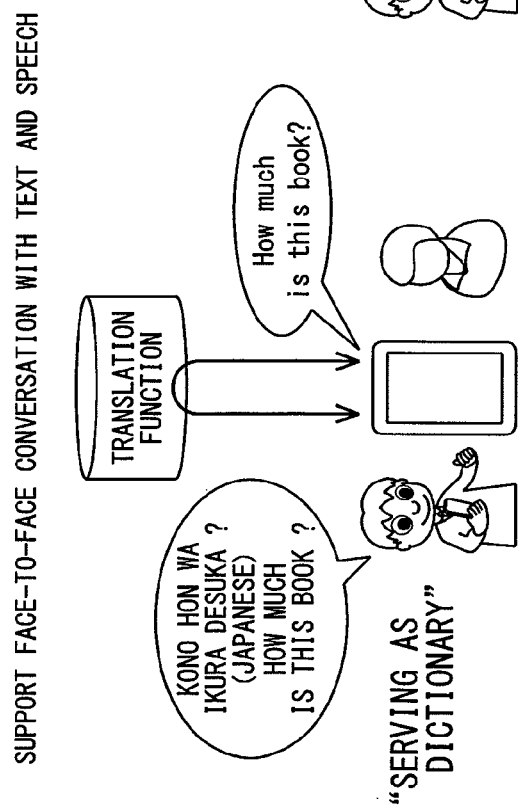
FIG. 13B is a diagram for explaining a configuration of a typical translating system.

FIG. 12 is a flowchart for explaining a service providing method performed by the service server apparatus according to the second embodiment. The service activating unit determines whether or not the performance of an application relating to the scheduler is instructed from the call-originating communication terminal device (step S1101). When determining that the performance of the application is instructed (step S1101: YES), the service activating unit activates each enabler of the service application unit. When determining that the performance of the application server is not instructed (step S1101: NO), the service activating unit stands by until such an instruction is given.

When the service activating unit activates each enabler, the activated telephone/call control enabler records the call speech (step S1102). The telephone/call control enabler determines whether or not it becomes a silent condition during the recording of the call speech (step S1103). When determining that it becomes the silent condition (step S1103: YES), the telephone/call control enabler once terminates the recording of the call speech (step S1104). The speech recognizing enabler performs a morphological analysis on the call speech recorded by the telephone/call control enabler (step S1105), and detects that the schedule adjustment has been instructed when the call speech includes a phrase meaning "schedule adjustment". The information managing enabler accesses the database, and obtains information on the schedule of each user during the telephone call from the database (step S1106).

The database according to such a second embodiment is a database that registers beforehand the schedule of the user. It is preferable that the schedule should be registered in a predetermined format set by the application of a mobile telephone. Moreover, the database according to the second embodiment may be arranged in the subscriber profile storing unit.

The image/video synthesizing-editing enabler generates task data including, for example, texts and images and illustrated in FIG. 11 using the extracted schedule (step S1107). The task data generated by the image/video synthesizing-editing enabler is transmitted to the call-originating communication terminal device and the call-receiving communication terminal device by the communication control unit 224 illustrated in FIG. 10 (step S1108).

According to the second embodiment, the user of the call-originating communication terminal device can check whether or not the content indicated by the user himself/herself matches the task data. Upon checking, when the task data differs from the content intended by the user himself/herself, the user of the call-originating communication terminal device gives an operation of instructing the service server apparatus 900 from the communication terminal device for correction. A correction instructing signal is transmitted through this operation. The task data being different from the intended content means a case where, for example, the user utters "raigetsu no sukejyuru (Japanese) schedule in next month", but the schedule in June is presented.

The speech recognizing enabler determines whether or not the task data has been corrected by the user based on whether or not the correction instructing signal has been transmitted (step S1109). When the task data has been corrected by the user (step S1109: YES), the speech recognizing enabler checks again the call speech corresponding to the corrected task data with the DB, and converts it in other texts. Next, the speech recognizing enabler generates text data using the other texts extracted by the result of the checking again. The text translating enabler and the speech synthesizing enabler generate again task data based on the text data extracted again (steps S1106 to 1109).

Conversely, when it is determined that no correction instructing signal has been input (step S1110: YES), the learning unit 280 illustrated in FIG. 10 changes the weight given to the text data stored in the DB. That is, the learning unit changes the weight of the text relating to the part corrected this time to be lowered, and reflects the content subjected to the change in the DB. After the above-explained processes, the service activating unit determines whether or not the user has instructed the termination of the service (step S1111). When the service activating unit determines that the termination of the service has not been instructed (step S1111: NO), the service activating unit causes the telephone/call control unit to keep recording the call speech. Moreover, when determining that the termination of the service has been instructed (step S1111: YES), the service activating unit terminates the service in accordance with the instruction.

(Service Providing Program)

The above-explained service server apparatus performs a service providing program performed by the service server apparatus for providing a service by a different task from a speech communication during the communication between speech communication terminal devices which can communicate with each other via speeches. The service providing program is a program that allows a computer to realize: an instruction receiving function of receiving an instruction for performing the different task during the speech communication; a recording function of recording a call speech of a speaker during the communication of the plurality of speech communication terminal devices; a task performing function of determining an instruction given by the user of the speech communication terminal device based on the call speech recorded by the recording function when the instruction receiving function receives the instruction, extracting information registered beforehand in accordance with the instruction, and generating task data including at least either one of texts and images using the extracted information; and a task data providing function of providing, together with the call speech, the task data including at least either one of the texts and the images to each of the plurality of speech communication terminal devices performing the speech communication.

According to the second embodiment, the CC service of adjusting the schedule is carried out for the telephone call between the two users. The second embodiment is, however, not limited to the telephone call between the two persons, and can be applied to a telephone conference, etc., among three or more persons to have a conversation.

The scope and spirit of the present invention are not limited to the illustrated, explained and exemplified embodiments, and include all embodiments bringing about the equivalent advantages to the object of the present invention. The scope and spirit of the present invention are not limited to a combination of features of the present invention set forth in appended claims, but can be defined by all desirable combinations of specific features among all of the disclosed features.

INDUSTRIAL APPLICABILITY

The present invention can provide a service providing apparatus, a service providing method, and a service providing program suitable for supporting a communication through a smart phone, etc.

REFERENCE SIGNS LIST 200, 900 Service server apparatus
201 Telephone/call control enabler
202 Speech synthesizing enabler
203 Speech recognizing enabler
204 Text translating enabler
205, 206, 261 Enabler group
208 Device management controlling enabler
209 Presence enabler
210 Telephone directory enabler
211 SNS enabler
212 Messaging enabler
213 Community managing enabler
214 Information managing enabler
215 Image and video synthesizing/editing enabler
216 Font converting enabler
217 Image and video recognizing enabler
218 Session collaborating enabler
219 Point managing enabler
221 Subscriber profile storing unit
222 Authentication permitting unit
223 Billing process unit
224 Communication control unit
225, 226, 227 Service application unit
230 Network
280 Learning unit
241a, 641a Call-originating communication terminal device
241b, 641b Call-receiving communication terminal device

The invention claimed is:

1. A service server apparatus connected to a plurality of speech communication terminal devices that perform speech communication with each other via a speech and providing a service by a different task that is a work performed by a different application from a task performed by an application relating to the speech communication between the speech communication terminal devices, the service server apparatus comprising:
- an instruction receiving unit configured to receive an instruction for performing the different task during the speech communication;
- a recording unit configured to record a call speech of a speaker during the speech communication between the plurality of speech communication terminal devices;
- a task performing unit configured to perform the different task based on the call speech recorded by the recording unit, when the instruction receiving unit receives the instruction;
- a task data providing unit configured to provide, to each of the plurality of speech communication terminal devices performing the speech communication, task data including text data obtained by performing the different task by the task performing unit and speech data obtained by performing the different task by the task performing unit,
- wherein the task performing unit converts the call speech into a text to generate text data, translates the text data into another language to generate translated text data, and converts the translated text data into a speech to generate speech data, and
- wherein the task data providing unit provides, to each of the plurality of speech communication terminal devices performing the speech communication, the task data including the text data, the translated text data, and the speech data together with the call speech;
- a correction instruction receiving unit configured to receive a correction instruction for the task data transmitted to the speech communication terminal devices; and
- a learning unit configured to give a weight to data used when the task data is generated based on the correction instruction received by the correction instruction receiving unit.

2. A service server apparatus connected to a plurality of speech communication terminal devices that perform speech communication with each other via a speech and providing a service by a different task that is a work performed by a different application from an application relating to the speech communication between the speech communication terminal devices, the service server apparatus comprising:
- an instruction receiving unit configured to receive an instruction to perform the different task during the speech communication;
- a recording unit configured to record a call speech of a speaker during the speech communication between the plurality of speech communication terminal devices;
- a task performing unit configured to perform the different task based on the call speech recorded by the recording unit, when the instruction receiving unit receives the instruction;
- a task data providing unit configured to provide, to each of the plurality of speech communication terminal devices performing the speech communication, task data obtained by performing the different task by the task performing unit,
- wherein the task performing unit determines an instruction given by a user of the speech communication terminal device based on the call speech, extracts information registered beforehand in accordance with the instruction, and generates the task data including at least either one of a text and an image using the extracted information, and
- wherein the task data providing unit provides, to each of the plurality of speech communication terminal devices performing the speech communication, the task data including at least either one of the text and the image together with the call speech;
- a correction instruction receiving unit configured to receive a correction instruction for the task data transmitted to the speech communication terminal devices; and
- a learning unit configured to give a weight to data used when the task data is generated based on the correction instruction received by the correction instruction receiving unit.

3. A service server apparatus connected to a plurality of speech communication terminal devices that perform speech communication with each other via a speech and providing a service by a different task that is a work performed by a different application from an application relating to the speech communication between the speech communication terminal devices, the service server apparatus comprising:
- an instruction receiving unit configured to receive an instruction to perform the different task during the speech communication;
- a recording unit configured to record a call speech of a speaker during the speech communication between the plurality of speech communication terminal devices;
- a task performing unit configured to perform the different task based on the call speech recorded by the recording unit, when the instruction receiving unit receives the instruction; and
- a task data providing unit configured to provide, to each of the plurality of speech communication terminal devices performing the speech communication, task data obtained by performing the different task by the task performing unit,
- wherein the task performing unit determines an instruction given by a user of the speech communication terminal device based on the call speech, extracts information registered beforehand in accordance with the instruction, and generates the task data including at least either one of a text and an image using the extracted information,
- wherein the task data providing unit provides, to each of the plurality of speech communication terminal devices performing the speech communication, the task data including at least either one of the text and the image the image together with the call speech, and
- wherein when an instruction given by the user is determined to adjust a schedule of the user, the task performing unit extracts schedule information on an activity of the user registered beforehand and a date and an hour at which the activity is to be carried out, and extracts, using the extracted schedule information, a common date and hour at which no activity of the users of the plurality of speech communication terminal devices is commonly registered.

4. The service server apparatus according to claim 1 or 2, wherein the task data providing unit transmits the text data in the task data to a text communication terminal device associated with the speech communication terminal device and communicable via a text, instead of the speech communication terminal device.

5. A service providing method by a service server apparatus connected to a plurality of speech communication terminal devices for performing speech communication with each other via a speech and providing a service by a different task that is a work performed by a different application from an application relating to the speech communication between the speech communication terminal devices, the service providing method comprising:
- an instruction receiving step for receiving an instruction for performing the different task during the speech communication;
- a recording step for recording a call speech of a speaker during the speech communication between the plurality of speech communication terminal devices;
- a task performing step for converting the call speech into a text to generate text data based on the call speech recorded in the recording step, translating the text data into another language to generate translated text data, and converting the translated text data into a speech to generate speech data when the instruction is received through the instruction receiving step;
- a task data providing step for providing, to each of the plurality of speech communication terminal devices performing the speech communication, task data including the text data, the translated text data, and the speech data together with the call speech;
- a correction instruction receiving step for receiving a correction instruction for the task data transmitted to the speech communication terminal devices; and
- a learning step for giving a weight to data used when the task data is generated based on the correction instruction received in the correction instruction receiving step.

6. A service providing method by a service server apparatus connected to a plurality of speech communication terminal devices for performing speech communication with each other via a speech and providing a service by a different task that is a work performed by a different application from an application relating to the speech communication between the speech communication terminal devices, the service providing method comprising:
- an instruction receiving step for receiving an instruction for performing the different task during the speech communication;
- a recording step for recording a call speech of a speaker during the speech communication between the plurality of speech communication terminal devices;
- a task performing step for determining an instruction given by a user of the speech communication terminal device based on the call speech recorded through the recording step, extracting information registered beforehand based on the instruction, and generating task data including at least either one of a text and an image using the extracted information when the instruction is received through the instruction receiving step;
- a task data providing step for providing, to each of the plurality of speech communication terminal devices performing the speech communication, the task data including at least either one of the text and the image together with the call speech;
- a correction instruction receiving step for receiving a correction instruction for the task data transmitted to the speech communication terminal devices; and
- a learning step for giving a weight to data used when the task data is generated based on the correction instruction received in the correction instruction receiving step.

7. A non-transitory computer readable medium storing a service providing program performed by a service server apparatus connected to a plurality of speech communication terminal devices for performing speech communication with each other via a speech and providing a service by a different task that is a work performed by a different application from an application relating to the speech communication between the speech communication terminal devices, the service providing program allowing a computer to realize:
- an instruction receiving function of receiving an instruction for performing the different task during the speech communication;
- a recording function of recording a call speech of a speaker during the speech communication between the plurality of speech communication terminal devices;
- a task performing function of converting the call speech into a text to generate text data based on the call speech recorded by the recording function, translating the text data into another language to generate translated text data, and converting the translated text data into a speech to generate speech data when the instruction is received by the instruction receiving function;
- a task data providing function of providing, to each of the plurality of speech communication terminal devices performing the speech communication, task data including the text data, the translated text data, and the speech data together with the call speech;
- a correction instruction receiving function of receiving a correction instruction for the task data transmitted to the speech communication terminal devices; and
- a learning function of giving a weight to data used when the task data is generated based on the correction instruction received by the correction instruction receiving function.

8. A non-transitory computer readable medium storing a service providing program performed by a service server apparatus connected to a plurality of speech communication terminal devices for performing speech communication with each other via a speech and providing a service by a different task that is a work performed by a different application from an application relating to the speech communication between the speech communication terminal devices, the service providing program allowing a computer to realize:
- an instruction receiving function of receiving an instruction for performing the different task during the speech communication;
- a recording function of recording a call speech of a speaker during the speech communication between the plurality of speech communication terminal devices;
- a task performing function of determining an instruction given by a user of the speech communication terminal device based on the call speech recorded by the recording function, extracting information registered beforehand based on the instruction, and generating task data including at least either one of a text and an image using the extracted information when the instruction is received by the instruction receiving function;
- a task data providing function of providing, to each of the plurality of speech communication terminal devices performing the speech communication, the task data including at least either one of the text and the image together with the call speech
- a correction instruction receiving function of receiving a correction instruction for the task data transmitted to the speech communication terminal devices; and
- a learning function of giving a weight to data used when the task data is generated based on the correction instruction received by the correction instruction receiving function.

9. A service providing method by a service server apparatus connected to a plurality of speech communication terminal devices for performing speech communication with each other via a speech and providing a service by a different task that is a work performed by a different application from an application relating to the speech communication between the speech communication terminal devices, the service providing method comprising:

> an instruction receiving step for receiving an instruction for performing the different task during the speech communication;
>
> a recording step for recording a call speech of a speaker during the speech communication between the plurality of speech communication terminal devices;
>
> a task performing step for determining an instruction given by a user of the speech communication terminal device based on the call speech recorded through the recording step, extracting information registered beforehand based on the instruction, and generating task data including at least either one of a text and an image using the extracted information when the instruction is received through the instruction receiving step; and
>
> a task data providing step for providing, to each of the plurality of speech communication terminal devices performing the speech communication, the task data including at least either one of the text and the image together with the call speech;
>
> wherein when an instruction given by the user is determined to adjust a schedule of the user, further comprising an extracting step of extracting schedule information on an activity of the user registered beforehand and a date and an hour at which the activity is to be carried out, and extracting, using the extracted schedule information, a common date and hour at which no activity of the users of the plurality of speech communication terminal devices is commonly registered.

10. A non-transitory computer readable medium storing a service providing program performed by a service server apparatus connected to a plurality of speech communication terminal devices for performing speech communication with each other via a speech and providing a service by a different task that is a work performed by a different application from an application relating to the speech communication between the speech communication terminal devices, the service providing program allowing a computer to realize:

> an instruction receiving function of receiving an instruction for performing the different task during the speech communication;
>
> a recording function of recording a call speech of a speaker during the speech communication between the plurality of speech communication terminal devices;
>
> a task performing function of determining an instruction given by a user of the speech communication terminal device based on the call speech recorded by the recording function, extracting information registered beforehand based on the instruction, and generating task data including at least either one of a text and an image using the extracted information when the instruction is received by the instruction receiving function; and
>
> a task data providing function of providing, to each of the plurality of speech communication terminal devices performing the speech communication, the task data including at least either one of the text and the image together with the call speech;
>
> wherein when an instruction given by the user is determined to adjust a schedule of the user, an extraction function of extracting schedule information on an activity of the user registered beforehand and a date and an hour at which the activity is to be carried out, and extracting, using the extracted schedule information, a common date and hour at which no activity of the users of the plurality of speech communication terminal devices is commonly registered.

* * * * *